United States Patent [19]

Henderson et al.

[11] Patent Number: 4,526,269
[45] Date of Patent: Jul. 2, 1985

[54] SINGULATOR

[75] Inventors: Jerald M. Henderson, Davis; Burford J. Furman, San Jose, both of Calif.

[73] Assignee: The Regents of the University of California, Berkeley, Calif.

[21] Appl. No.: 505,839

[22] Filed: Jun. 20, 1983

[51] Int. Cl.³ ............................................. B65G 47/12
[52] U.S. Cl. .................................... 198/443; 198/474; 221/233
[58] Field of Search ............... 198/443, 392, 803, 616, 198/474; 221/233, 254, 81

[56] References Cited

U.S. PATENT DOCUMENTS 2,667,961  2/1954  Reese et al. ........................... 198/443
3,471,000  10/1969  Bodolay et al. ...................... 198/443
4,279,336  7/1981  Henderson et al. .................. 198/443

FOREIGN PATENT DOCUMENTS 2071038  9/1981  United Kingdom ............... 198/803

Primary Examiner—Joseph E. Valenza
Assistant Examiner—Jonathan D. Holmes
Attorney, Agent, or Firm—Lothrop & West

[57] ABSTRACT

A rotary turntable has an upward step and a peripheral rim divided into pockets by upstanding radial walls. Objects deposited at random near the center of the turntable move by centrifugal force and some gravitational pull toward the step. They are individually separated by vertically reciprocating radial walls and are lifted up to the step and to the rim by lifters vertically reciprocating in time with the radial walls as the turntable revolves. A peripheral wall or band engages the outer ends of the partitions to retain objects in the pockets except for a small part of the periphery through which the pocketed objects are singly discharged.

7 Claims, 8 Drawing Figures

FIGURE 4
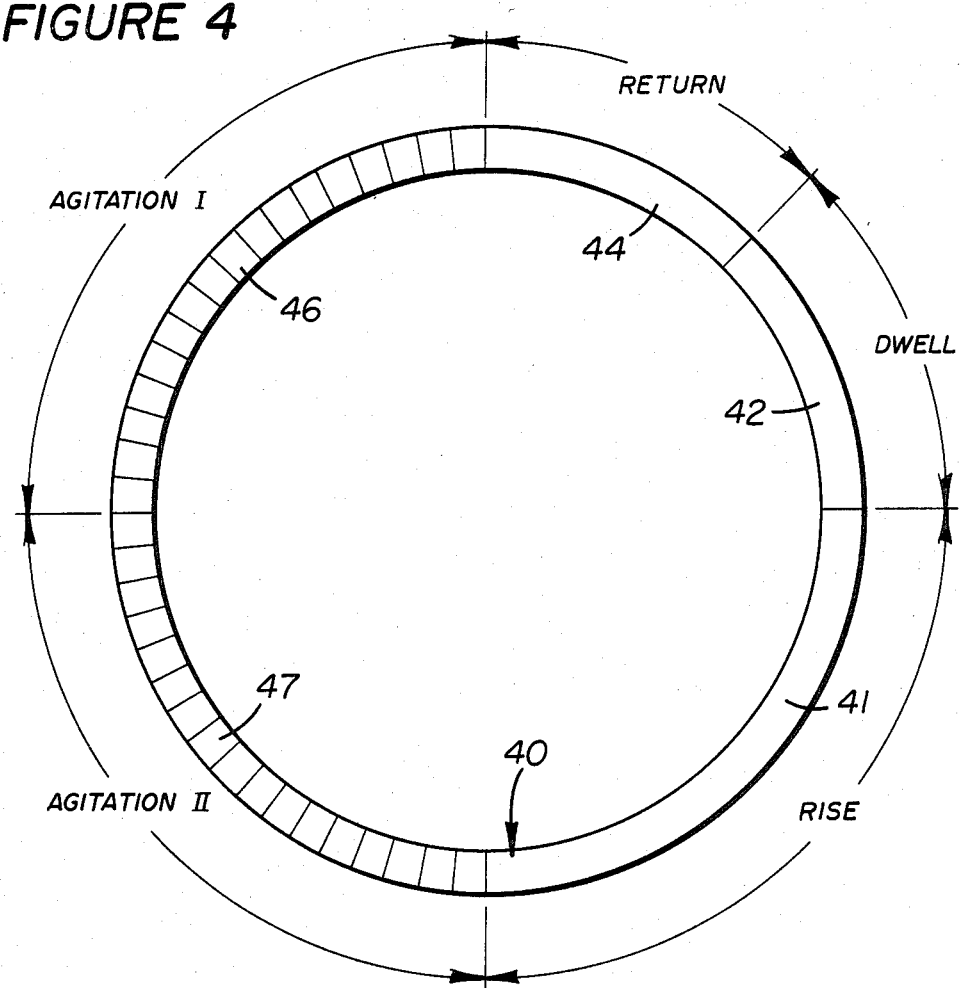
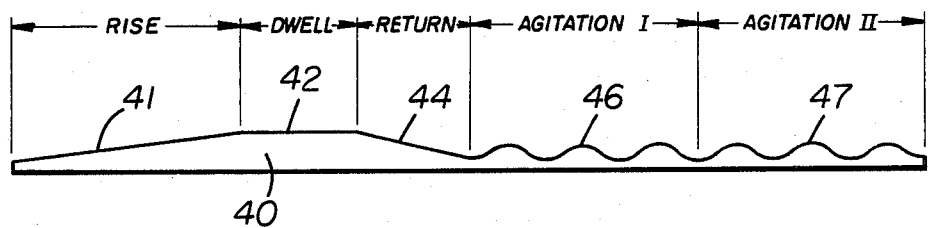
FIGURE 5

SINGULATOR

BRIEF SUMMARY OF THE INVENTION

A rotary turntable has a peripheral upward step and also a peripheral rim around the step and divided into pockets by upstanding radial walls. Objects deposited at random near the center of the rotary turntable move by centrifugal force toward the step. They are individually agitated by vertically reciprocating radial walls. They are individually lifted up above the step and to the rim by lifters vertically reciprocated in time with the rotation of the turntable. A peripheral wall or band engages the outer ends of the partitions to retain objects in the pockets except for a small part of the periphery through which the pocketed objects are singly discharged, in order.

PRIOR ART OF INTEREST

The prior art presently known to the applicants is U.S. Pat. No. 4,279,336, issued July 21, 1981 to Henderson et al., and the patents listed as references therein.

These patents have to do with the subject of singulation, but they do so in ways considerably different from the present disclosure.

BRIEF DESCRIPTION OF THE SEVERAL VIEWS OF THE DRAWINGS

FIG. 4 is a diagram in plan showing disposition of the cam structure.

FIG. 5 is a development, to a reduced scale, of the cam structure of FIG. 4.

DETAILED DESCRIPTION

Figure 1:
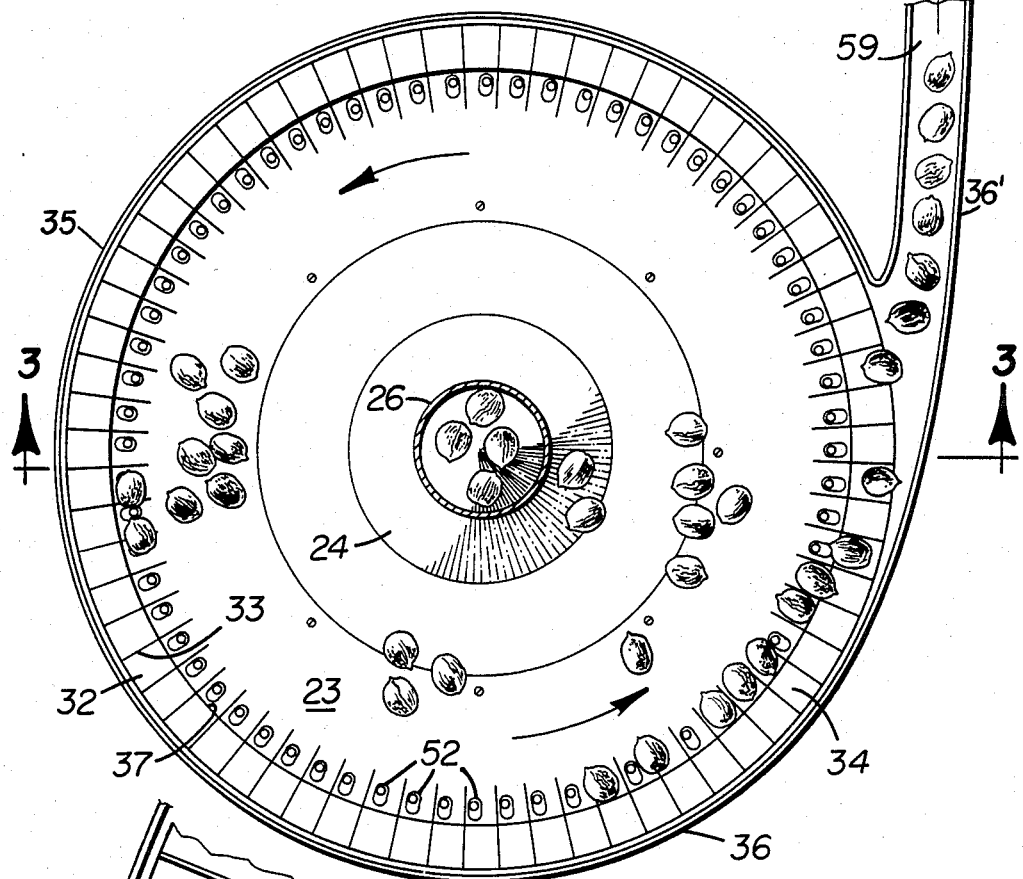
FIG. 1 is a plan, partially diagrammatic, showing a singulator in accordance with the present invention.
Figure 2:
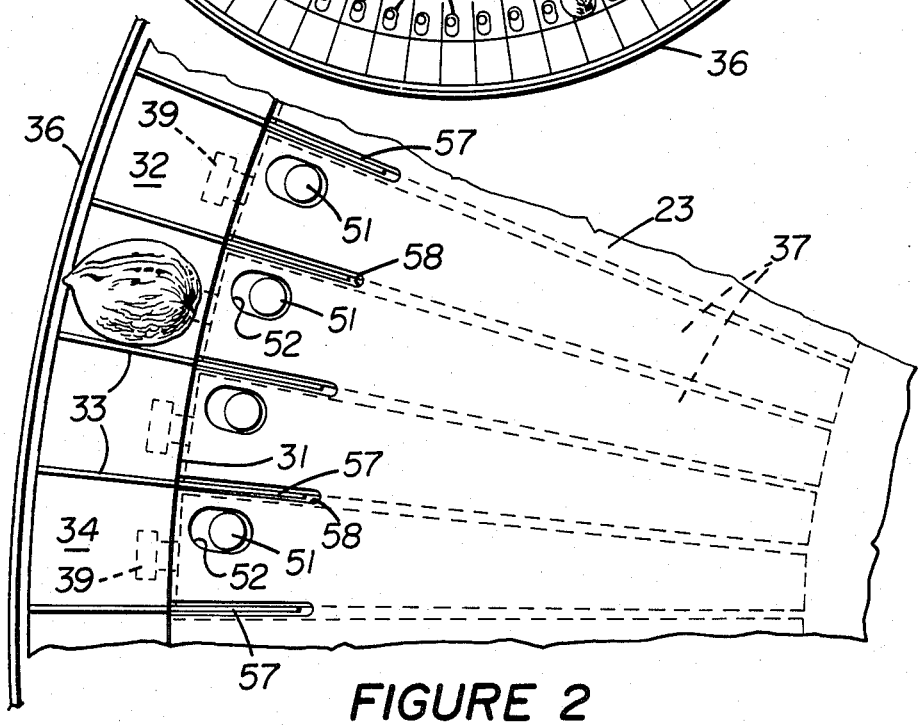
FIG. 2 is a portion of the showing in FIG. 1, shown to an enlarged scale.
Figure 3:
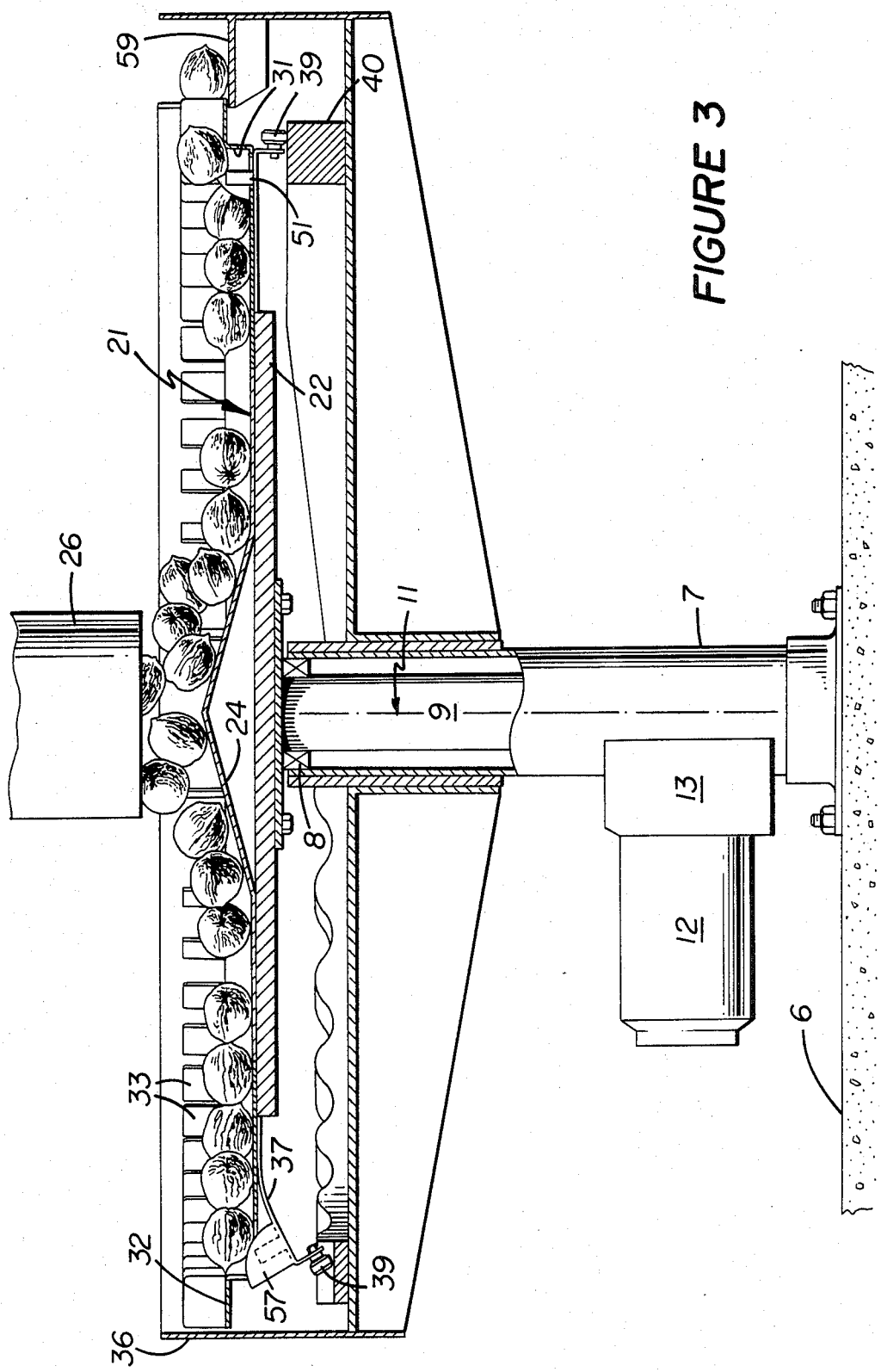
FIG. 3 is a cross-section, to an enlarged scale, taken along the line 3—3 of FIG. 1.
Figure 6:
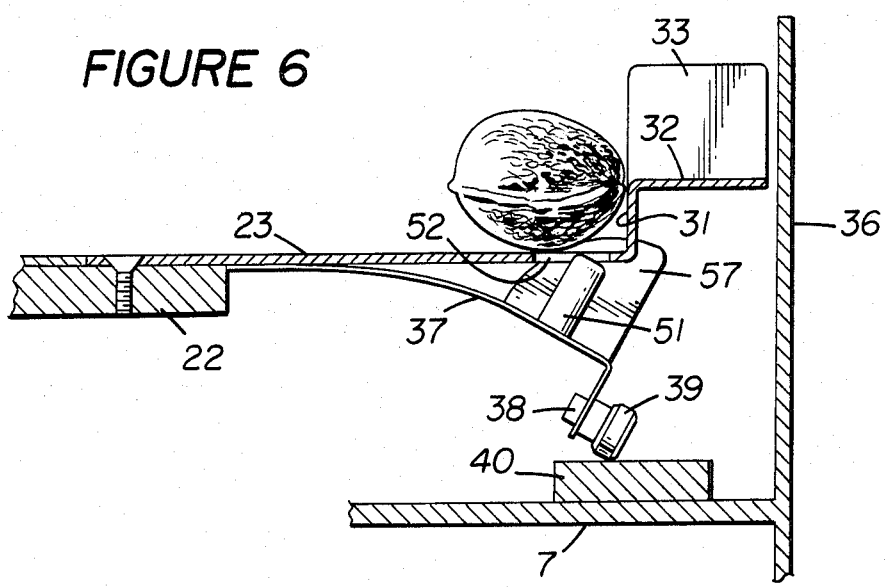
FIG. 6 is a cross-section in a plane a few degrees in advance of the plane of FIG. 3 and showing the parts to an enlarged scale before the lifting step.
Figure 7:
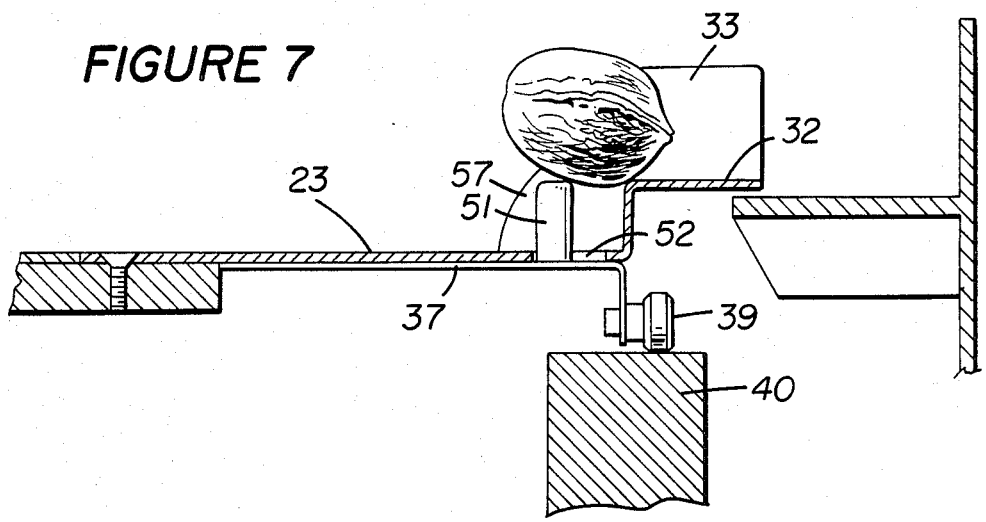
FIG. 7 is a cross-section in a plane a few degrees after the plane of FIG. 3 and showing the parts at the end of the lifting step.
Figure 8:
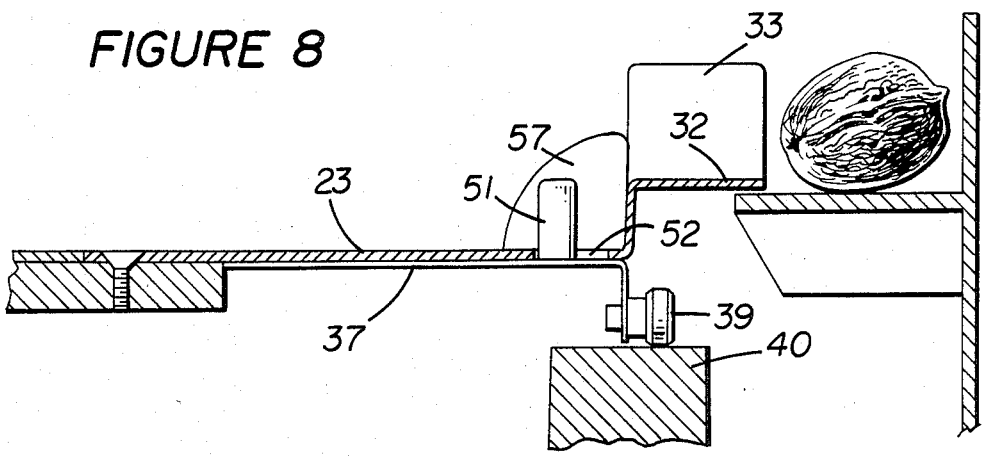
FIG. 8 is a cross-section in a plane a few more degrees after the plane of FIG. 3 and showing the parts after the object has been lifted and radially discharged.

In the above-identified U.S. Pat. No. 4,279,336, there is disclosed a singulator for the same general purpose as the singulator herein; namely, to accept objects such as fruit or nuts or the like in random array and to discharge such objects in a regular, separated or individual order. As an example in the former case and in this one, walnuts are utilized, although the objects involved may be virtually anything fairly firm that occurs within a reasonable range of sizes and shapes.

Walnuts are chosen herein because they are generally of a uniform shape although they vary somewhat in different dimensions. They are usually received from the field in bulk and in random array. They are gently treated by the current machine to avoid mechanical damage. They are ultimately expelled from the machine in original condition and in a definite, separated, individual order.

The singulator herein is installed on a floor 6 or support such as a plant floor and has a base 7 including an upright stand secured to the floor and carrying bearings 8 for supporting a drive shaft 9 for rotation about a vertical axis 11. The shaft is rotated at a chosen speed by a suitable motor 12 joined through a drive mechanism 13 to the shaft 9. An ordinary rate of rotation of the shaft 9 is in the vicinity of 30 revolutions per minute.

At a convenient height at the top of the shaft 9 there is mounted a circular turntable 21 having an appropriate central support 22 and finished by an upwardly open generally planar annular sheet 23, conveniently of metal or the like. At the center of the turntable 21 there is provided a cone 24 resting just beneath an overhead feed tube 26. This extends from a suitable supply (not shown) of the objects, such as walnuts, and is open at the bottom and terminates a short distance above the cone 24. Nuts discharged from the feed tube 26 fall by gravity and at random onto the cone 24 in the general area of and around its apex. They then distribute themselves at random partly by gravity down the incline of the cone and partly by centrifugal force radially outwardly of the cone onto the planar portion 23 of the table 21.

The objects travelling randomly with a radially outward component continue their movement in a random fashion until they are arrested by a circular, vertical step 31. This is essentially an annular band upstanding from the surface of the sheet 23 near the periphery of the table 21 and extending upwardly in an amount somewhat more than half the general height of the objects involved. The dimension is important only in that the step 31 be effective as a stop to arrest the radially outward movement of the objects.

The table sheet 23 continues past the step 31 and is developed into an annular, flat rim 32 merging with the step and of a radial dimension somewhat greater than the maximum dimension of the objects being handled. At spaced intervals on the rim 32, circumferentially apart and extending radially, are vertical separator walls 33. The spacing between the walls is something more than the dimension of one of the objects but is not as great as the combined dimension of two of the objects.

Encompassing the radially outward edges of the separator walls is a generally annular boundary wall 36. This is preferably a stationary, largely circular wall supported from the base 7 and extending for substantially the same height as the separator walls 33 and having a tangential discharge portion 36'. Alternatively, the wall 36 may be a belt, as shown in U.S. Pat. No. 4,279,336. This is a flexible belt (not shown herein) trained around and driven by or with the separator walls, yet departing therefrom in two tangential portions around an offset idler. In any case, the boundary wall 36 effects a continuous restriction around the periphery of the device except at a discharge point where the wall departs from the turntable. Any objects in the pockets 34 between the walls 33 and 36 can depart therefrom partly by centrifugal force and travel away from the machine in single file as singulated.

It has been found by extensive experiment that it is highly advisable to accomplish several operations on the objects accumulated against or near the vertical step 31 and resting on the table sheet 23. There is no necessary order to the array of such objects. Consequently, means are provided for jostling them so that they can move more readily with respect to each other and are readily displaced and disposed in a single layer.

Supported on the table sheet 23 and normally depending therefrom is a series of flat leaf springs 37 disposed generally radially and spaced a small circumferential distance from each other. Each spring at its outermost end carries a stub shaft 38 on which a cam follower wheel 39 is rotatably mounted. The cam follower wheel rests against an annular cam 40 supported on the base 7 concentrically with the axis 11 and having vertical or axial undulations in at least four categories. One of the undulations is a lifting ramp 41, an adjacent undulation is a dwell ramp 42, a third cam surface is a down ramp 44, while the remainder of the cam surfaces are undulating configurations 46 and 47. These are vibrating ramps. While these are illustrated the same way, they may have different amplitudes and frequencies.

Fixed on each spring 37 is an upstanding plunger 51 designed to move upwardly and downwardly through an opening 52 in or through the table sheet 23.

Likewise supported by the spring 37 is a radial partition wall 57 of partly arcuate form upstanding from the edge of the spring 37 and passing through a slit 58 extending radially of the table. The walls 33 and 57 are substantially in radial alignment. In the lowermost position of the spring, the partition walls 57 barely extend above the surface of the table or approximately so, whereas when the cam follower wheel 39 is at its uppermost elevation due to maximum height of the cam portion 42, not only does the plunger 51 extend the maximum amount through the slit 58 but the partition wall 57 likewise extends upwardly a maximum amount.

The spring 37 moves in an approximately arcuate path, and while the radial motion components or horizontal components are not particularly important, the vertical component is. In effect, the plunger 51 rises substantially vertically through the opening 52 and the wall 57 likewise rises with a vertical component through the slit 58 in the table sheet 23. The position of these elements is close to the vertical step 31.

As the turntable rotates and as the follower wheel 39 travels along the cam surface, the spring 37 is flexed upwardly and the plunger 51 and the wall 57 are lifted. The adjacent walls 57 successively lifted temporarily extend the radial pockets 34. The plunger 51 rises beneath any object which previously has been resting on the table against or near the step 31 and over or near the opening 52 and alongside the adjacent walls 57. The effect is to separate a single object against the vertical step by centrifugal force and between successive rising walls 57. Then such segregated object is lifted by operation of the plunger 51 while confined by the various walls, partly due to centrifugal force. The object is taken from the base elevation of the table sheet 23 up to a higher elevation approximately equal to or preferably slightly greater than the elevation of the flat rim 32. Since the table is always rotating, the centrifugal force on the lifted and radially segregated object tends to move the object radially outwardly into the pocket 34 between adjacent separator walls 33.

Following the upward movement of the plunger 51 and of the adjacent side walls 57, the cam follower wheel 39 descends on a downward ramp 44 of the cam 40 and allows spring withdrawal of the projecting parts to or below the surface of the table. This makes room for another, successive object to move centrifugally and approximately into position.

To assist such motion and to facilitate the rearrangement and shifting of the positions of the objects on the rotating table sheet 23, the cam 40 in its undulatory or vibratory portions 46 and 47 causes relatively rapid, repeated up and down motions of the plunger 51 and of the near walls 57. The effect of this is to impart shaking motions in various directions to the objects on the table. As the objects approach the wall or step 31 centrifugally they tend to move around easily and to shift with respect to each other. Instead of bridging or disposing in pairs across a wall or compartment, they tend to separate and to advance into the pockets between the rising or raised walls 57. In effect, they line themselves up for lifting by the plunger 51 and for segregation by the successive walls 57 and 33.

As the turntable rotates with objects in the various pockets 34, and as the boundary wall 36 departs tangentially from the periphery of the rotary table, the segregated or separated objects by centrifugal and rotational impetus move outwardly and may by gravity move downwardly onto a descending receiving trough 59 and are carried away in file for subsequent use.

In some instances, particularly if the machine is from time to time to be reassembled to handle different items or widely different amounts of articles, the turntable 21 or at least the outer portion thereof can be made up of a number of side-by-side, identical, individual, radial segments each detachably fastened to a central rotor such as the support 22. Each such radial segment can include not only a sheet section like the sheet 23, but also can include a leaf spring 37 with a follower wheel 39 and a plunger 51 and a partition wall 57. An upstanding section of a vertical step 31, a flat rim 32 and also a vertical separator wall 33 can also form parts of each individual sector. The operation of these individual sectors is as previously described, but they can be used in different numbers and at different radii from the axis 11 to afford increased versatility in use.

We claim:

1. A singulator for similar objects in miscellaneous array comprising a turntable, means for rotating said turntable about a vertical axis, means for depositing objects for singulation on said turntable in the vicinity of said axis, means on said turntable defining a vertical step extending upwardly near and substantially around the periphery of said turntable, means defining an opening through said turntable, and means including a plunger movable in a direction parallel to said axis and through said opening for lifting one of said objects on said turntable adjacent said step substantially to the top of said step.

2. A singulator as in claim 1 including an annular cam and means for supporting said cam stationarily with respect to said turntable and concentric with said axis in position to engage said plunger.

3. A singulator as in claim 2 in which said cam includes an up ramp, a down ramp and a vibrating ramp.

4. A singulator as in claim 1 including means defining a radial slit through said turntable adjacent said opening, and a radial partition wall on said lifting means movable through said slit in a direction parallel to said axis.

5. A singulator as in claim 4 including a separator wall on said rim and extending vertically above said rim and radially in alignment with said partition wall.

6. A singulator as in claim 1 including means for opposing lifting motion of said lifting plunger.

7. A singulator as in claim 1, including means defining a radial slit through said turntable adjacent said opening, and a partition wall on said lifting means movable through said slit in a direction lying in a plane containing said axis.

* * * * *